Dec. 3, 1929.                R. A. WARNER                1,738,466
FREQUENCY CONVERTER TIE
Filed Feb. 5, 1924
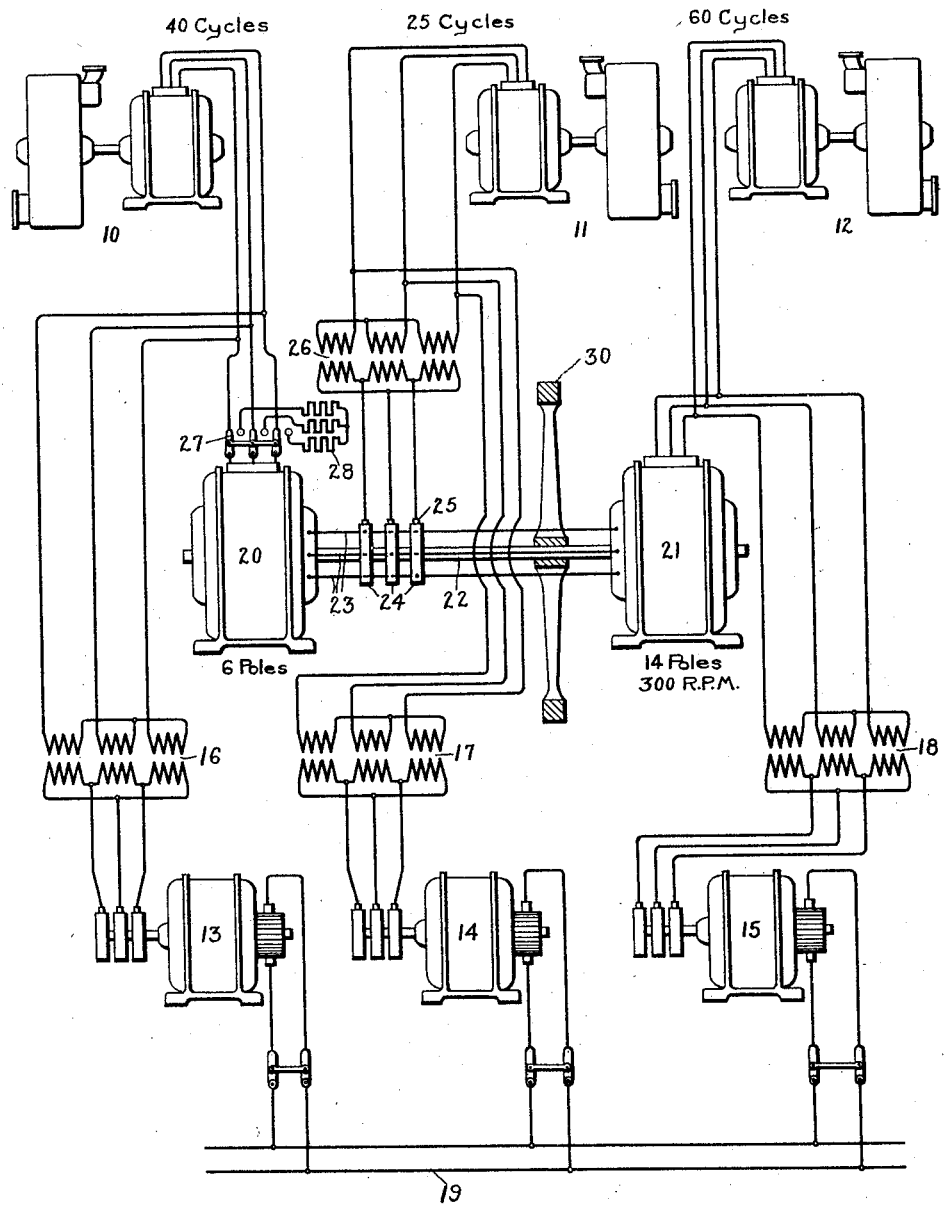
Inventor:
Russell A. Warner;
by *[signature]*
His Attorney.

Patented Dec. 3, 1929

1,738,466

UNITED STATES PATENT OFFICE

RUSSELL A. WARNER, OF SCHENECTADY, NEW YORK, ASSIGNOR TO GENERAL ELECTRIC COMPANY, A CORPORATION OF NEW YORK

FREQUENCY CONVERTER TIE

Application filed February 5, 1924. Serial No. 690,865.

My invention relates to a frequency and voltage tie between alternating current systems of different frequencies.

In application, Serial No. 628,886, Barton, filed May 30, 1923, entitled System of distribution, and assigned to the same assignee as the present application, there is described a system of distribution which permits the loads of a number of rotary converters, severally connected and supplied from alternating current systems of different frequencies and supplying a common direct current system, to be equally distributed irrespective of any tendency of the voltage and frequency of the alternating current systems to vary with respect to each other. In said application use is made of a frequency and voltage tie between the alternating current systems closely adjacent to the supply points for the rotary converters. The present application relates to another type of frequency and voltage tie suitable for such installations.

As pointed out in the application referred to, when two or more rotary converters which are connected in parallel on their direct current ends are supplied from a suitable source of alternating current, or from different sources, it becomes necessary to maintain substantially the same voltage relation at their alternating current terminals in order to guard against destructive unbalancing of the load between them or to guard against the inverting of a portion of the converters. When it is desired to supply the rotary converters from systems of different frequencies not only must the alternating current terminal voltage of the rotary converters be maintained within the desired relation, but the frequency relation between the different sysinal voltage of the rotary converters be maintained substantially fixed, otherwise a change in frequency on one system which is not accompanied by a proportionate change in the frequencies on the remaining systems will have a disturbing influence on the voltage relation which it is desired to maintain.

The present invention is particularly applicable for tying together three alternating current systems of different frequencies, although the invention may be adapted for tying together two such systems or more than three systems as will be hereinafter pointed out. The particular advantage of the present invention is that it makes use of only two simple, directly connected alternating current machines for tying together three systems and does not require the use of a separate starting motor or the use of a direct current exciter or of any auxiliary exciter unless power factor correction is desired. In carrying my invention into effect I make use of mechanically connected machines of the form wound induction type and for tying together three alternating current systems of different frequencies I select such pole numbers and a speed of two such machines that when the primaries thereof are connected to two such systems, the secondary frequencies of the induction machines are both equal to the frequency of the remaining system. By such an arrangement, the secondaries may be connected together and to the remaining system. The machines are furthermore arranged to run at one fixed sped, asuming fixed frequency of supply, in order to provide a substantialy fixed voltage transformation ratio between their primaries and secondaries.

The features of my invention which are believed to be novel and patentable will be pointed out in the claims appended hereto. For a better understanding of my invention, reference is made in the following description to the accompanying drawing which represents a layout of a preferred modification and installation of my invention.

Referring to the drawing 10, 11 and 12 represent power stations for generating alternating current energy at 40, 25 and 60 cycles respectively. These values are chosen since they represent frequencies which have been standardized in various parts of the country. Since the present tendency is for power companies to reach out and interconnect their various systems the present representation may be taken as typical of present conditions. It will, of course, be understood that the generating stations will supply various other apparatus not illustrated such that there will be a tendency for the voltage and frequency on the various systems to fluctuate slightly as the loads on the various systems change. The three systems are represented as supplying rotary converters 13, 14 and 15 through transformers 16, 17 and 18 respectively, which rotary converters all feed a common direct current system represented at 19.

To maintain the desired voltage relation on the alternating current ends of the rotary converters, which relation might otherwise be disturbed by a variation in voltage on one system only, the three systems are interconnected by a frequency and voltage tie consisting of form wound machines of the induction type 20 and 21 having their stators, which will hereinafter be termed the primaries, connected to the 40 and 60 cycle systems respectively and having their secondary rotor windings mounted on a common shaft 22. The rotor windings are electrically connected together by lines 23. The two machines have been represented some distance apart so as not to crowd the drawing; but in actual practice they will be located closer together so that the connections 23 will be fairly short and of low resistance. For the frequencies given the 40 cycle machine 20 may have six poles and the 60 cycle machine 21 may have 14 poles. At 300 R. P. M. their secondary frequencies will be equal to each other and to the frequency of the 25 cycle system. The transformer ratio between the primaries and secondaries of the machines 20 and 21 will be so chosen with respect to the voltages of their respective supply lines that, at 300 R. P. M., the secondary voltages of the two machines, will normally be equal. Since the secondary frequencies of the two machines are equal to 25 cycles, these secondaries may be connected to the 25 cycle system. For this purpose slip rings 24 are provided equal in number to the phase connections between the two secondary windings and the interconnected lines 23 are respectively connected to these slip rings in the usual manner. The slip rings are connected through brushes 25 and transformer 26 to the 25 cycle system, the ratio of the transformer 26 being selected to step down the voltage of the 25 cycle system to that corresponding to the slip ring voltage under normal conditions. In some cases it may be advantageous or desirable to supply all the excitation for the set from one system and in other cases it may be desirable to boost the voltage on one system at the expense of another system under normal voltage conditions. This can be accomplished to any desired extent by the proper selection of the transformer ratios. Thus, if it is desirable to supply the excitation from the 25 cycle system the transformer ratio at 26 will be such that it gives a slightly higher secondary voltage than that of the secondary voltages of machines 20 and 21 under normal conditions. In the appended claims where I have used the expression "substantially equal" in connection with secondary voltages I mean to include such arrangements as well as those arrangements where the normal secondary voltages are exactly equal. Various disconnecting switches not shown will be provided where necessary or desirable.

Assuming the frequency changer apparatus to be entirely disconnected from the lines, it may be started up and the tie-in made as follows:

A switch 27 will be thrown to the right connecting the stator winding of machine 20 to a suitable starting resistance 28. The stator winding of machine 21 will then be connected to the line and the apparatus will start, functioning as two concatenated induction motors. As soon as the speed approaches 300 R. P. M. the switch 27 is thrown to the left either manually or automatically, disconnecting the stator winding of machine 20 from the starting resistance and connecting it to the 40 cycle line. Although the synchronous induction motor speeds of the two machines, under these conditions are not equal, yet their starting in this manner is entirely feasible because the desired speed of 300 R. P. M. is reached before either machine reaches its synchronous speed. Thus the synchronous speed of machine 21 is 514 R. P. M. and that of machine 20 is 500 R. P. M., when the latter is excited at 25 cycles which is the lowest frequency imposed upon its rotary winding under starting conditions. It will thus be evident that, although the two machines may be permanently, electrically and mechanically connected together, the arrangement lends itself to desirable starting conditions without the use of a separate starting motor or complicated starting apparatus.

As soon as the primaries of the two machines are connected to their respective systems, the machines lose their induction motor slip characteristics and take on the characteristics of synchronous machines each having its rotor supplied by alternating current excitation from the other, in this case at 25 cycles, while the stator and rotor windings of the two machines function as primary and secondary windings of transformers, those of machine 20 transforming from 40 to 25 cycles and those of machine 21 transforming from 60 to 25 cycles, this being possible due to the fact that, with the pole numbers and frequencies specified, the secondary windings are rotated with respect to their primary windings at the correct speed to permit such transformation to take place.

The relation between pole numbers, speed and frequency of such a combination may be expressed by formula. Thus, if we let S represent the rotor speed in R. P. M., $F_1$ the primary frequency of the machine having $P_1$ poles, $F_2$ the primary frequency of the machine having $P_2$ poles and $F$ the secondary frequency, then $$S = \frac{(F_1 - F)120}{P_1} = \frac{(F_2 - F)120}{P_2} \quad \text{(I)}$$

Where the secondary system is to be connected to another system of known frequency the values of $F_1$, $F_2$ and $F$ are fixed, and it is only necessary to find a combination of rotor speed and pole numbers that will satisfy the formula. Thus, if $F_1 = 40$, $F_2 = 60$ and $F = 25$, expression (I) above reduces to $$S = \frac{1800}{P_1} = \frac{4200}{P_2}$$

If S is taken as 300, $P_1$ must be equal to 6 and $P_2$ equal to 14, which values satisfy the triple equation and give a desirable combination. In some cases, in order to work out a desirable combination, it may be necessary to have the rotors operate at different speeds in which case, the rotors will be connected together by gearing and two sets of slip rings will be necessary to complete the secondary connection.

Assuming normal frequency on the 40 and 60 cycle systems, it will be observed that the speed of the machine is fixed in this case at 300 R. P. M., even though the connection from the slip rings to the 25 cycle system is open, because a change in speed can only take place when there is a change in the $(F_1 - F)$ and $(F_2 - F)$ parts of the formula. And since F in both machines must be the same, S cannot change unless the frequency of one or both systems changes such that $(F_1 - F)$ and $(F_2 - F)$ change and, $$\frac{(F_1 - F)}{P_1} \text{ remains equal to } \frac{(F_2 - F)}{P_2}.$$

It will thus be evident that when the switch 27 is thrown to connect machine 20 to the 40 cycle line after the starting operation, the speed of the set will immediately fix itself at 300 R. P. M., with a secondary frequency of 25 cycles. The slip rings may then be connected to the 25 cycle system through the transformer 26 and the three systems will be tied together in a substantially fixed voltage relation, since the tie is substantially equivalent to three transformers all connected to a common bus-bar on their secondary sides. When the 25 cycle system is thus connected, the liability for change in speed to occur is still further reduced because it constitutes one more factor tending to keep the $(F_1 - F)$ and $(F_2 - F)$ parts of the formula fixed.

It is highly important that the values of these parts of the formula remain substantially fixed because any material variation therein will change the transformer ratio of the rotating transformers, it being well known that the transformer ratio of an induction motor varies with the speed or slip frequency. It will be evident, however, that there is a remote possibility of a combination of frequency variations occurring on the various systems such as will tend to vary the speed of the set. To still further oppose momentary changes in its speed it may be desirable in some cases, where the frequency variation tendencies are pronounced, to add a fly-wheel to the rotating part of the apparatus as indicated at 30. In other cases the fly-wheel effect of the rotating armatures themselves may be sufficient to overcome any abnormal speed changing tendencies.

It will be evident to those familiar with alternating current apparatus that, as the frequency of any one of the systems tends to vary, the tendency will be resisted, by the apparatus described, by a transfer of energy tending to correct the variation. This transfer of energy may occur by transformer action between any two or all of the systems, or it may occur by motor generator action between the 40 and 60 cycle systems, or it may occur partially by transformer action and partially by motor generator action, or the kinetic energy capacity or fly-wheel effect of the rotating parts may serve to supply or absorb correcting energy. The nature of the energy transfer in any case will be dependent upon the condition or conditions to be corrected. Neglecting the losses in the machines and that portion of the correcting energy taken up or given out by fly-wheel effect, the energy delivered to the machine at any instant must equal the energy given out.

The fly-wheel will be particularly advantageous where the two machines are used as a tie between two systems only. Thus, if we disconnect the 25 cycle system by raising the brushes 25, we have a voltage tie between the 40 and 60 cycle systems and a transient frequency tie to some extent depending upon the magnitude of the fly-wheel effect which tends to resist sudden changes in speed. In case it is desirable to tie together only two systems as just explained, the secondary frequency may be made anything desired, and in which case, it will generally be advantageous to select a low secondary frequency. To cite a specific example, a tie between a 25 and 60 cycle system may consist of a 4-pole machine connected to the 25 cycle system and a 10-pole machine connected to the 60 cycle system. Where, as in this case, one machine will operate above its true synchronous speed the equation hereinbefore used for that machine becomes $$S = \frac{(F_2 + F)120}{P_2}$$

and the complete formula becomes $$S = \frac{(F_1 - F)120}{P_1} = \frac{(F_2 + F)120}{P_2} \quad (II)$$

The general formula may thus be expressed $$S = \frac{(F_1 \pm F)120}{P_1} = \frac{(F_2 + F)120}{P_2} \quad (III)$$

In the example given the secondary frequency will be 5/7 of a cycle and the set will have a speed of 728-4/7 R. P. M. The speed is very close to the normal synchronous speed of the 4 and 10-pole machines which are 750 and 720 R. P. M., respectively. These machines may, therefore, be of standard design.

In all cases it will generally be desirable to design the induction machines with low reactance in order that the voltage tie may efficiently accomplish its purpose. It will, of course, be obvious that additional different frequency systems may be tied together with those illustrated by adding other induction machines having the correct speed and frequency relation. Such a tie permits the rotary converters 13, 14 and 15 to be safely connected in parallel on their direct current sides when their alternating current ends are supplied from the different frequency systems and the converters are here illustrated to show one practical illustration of where such a tie between such systems is desirable.

In accordance with the patent statutes, I have described the principle of operation of my invention and certain specific modifications thereof which I now believe to represent the best arrangements under the conditions assumed, but I desire to have it understood that these modifications are only illustrative and that the invention may be otherwise carried out. I, therefore, do not wish to be limited to the particular modifications herein shown and described but seek to cover in the appended claims all modifications which come fairly within the true spirit and scope of my invention.

What I claim as new and desire to secure by Letters Patent of the United States, is:—

1. In an electric distribution system, a plurality of independent alternating current systems of different frequencies, induction dynamo electric machines of the wound secondary type respectively connected to said systems, said machines having polar relations such that when running in one fixed speed relation their secondary frequencies are all equal to the frequency of an additional different frequency alternating current system, means for mechanically connecting the rotating members of said machine in said fixed speed relation and electric power connections between the secondary windings of said machines and the said additional system.

2. A frequency changer tie for three alternating current systems of different frequencies comprising two induction machines of the form wound secondary type having their primary windings arranged to be respectively connected to two of said systems, said machines having a pole number relation such that when running in one fixed speed relation their secondary frequencies are equal to the frequency of the third system, and the transformer ratio between their primary and secondary windings under these conditions is such that their secondary voltages are normally substantially equal, means for mechanically connecting the rotating members of said machines in said fixed speed relation, electric power connections between the secondaries of said machines and means for establishing an electric power connection between said secondaries and said third system.

3. A frequency changer tie for three alternating current systems of different frequencies, comprising two induction machines of the form wound secondary type having their primary windings adapted to be respectively connected to two of said systems, and having their rotating members mounted on a common shaft, electrical connections between the secondary windings of said machines and to said third system, the relation between the speed, and pole members of the machines and the frequencies of the three systems being such that the secondary frequencies of said induction machines are equal to that of the third system.

4. A frequency changer tie for three alternating current systems of different frequencies, comprising two induction machines of the form wound induction type having their primary windings respectively connected to two of said systems, and having their secondary windings mounted for rotation on a common shaft and electrically connected together, the pole number ratio and transformer ratio of said machines being such that when their secondary members are rotating at one fixed speed with respect to their primary members their secondary frequencies are equal to the frequency of the third system and their secondary voltages are normally substantially equal, and a transformer connected between said secondary windings and the third system for substantially equalizing the normal voltage difference therebetween.

5. A frequency changer tie for three alternating current systems of different frequencies comprising three transformers, said transformers having their primary windings respectively connected to the three systems and having their secondary windings connected together, and means whereby the primaries and secondaries of two of said transformers may be relatively rotated in a fixed speed relation such that the secondary frequencies of said transformers are normally equal and their normal secondary voltages are substantially equal.

6. Means for establishing a tie between 40, 25 and 60 cycle alternating current systems comprising a 6-pole form wound induction machine having its stator winding connected to the 40 cycle system, a 14 pole form wound induction machine having its stator connected to the 60 cycle system, said machines having their rotor members mechanically and electrically connected together and a stationary transformer connected between the 25 cycle system and the rotor windings of said induction machines, the voltage ratio between the primary and secondary windings of said induction machines being such that at 300 R. P. M., their secondary voltages are normally substantially equal to the secondary voltage of the stationary transformer.

7. Means for establishing a voltage tie between two alternating current systems of different frequencies comprising a pair of induction machines of the form wound secondary type having their primary windings respectively connected to the two systems and having their secondary windings electrically connected together, said machines having a pole number relation and transformer ratio such that when their rotating members are running in one fixed speed relation their secondary frequencies are normally equal and their secondary voltages are normally substantially equal, and means for mechanically connecting the rotating members of said machines in said fixed speed relation.

8. Means for establishing a tie between two alternating current systems of different frequencies according to claim 7, characterized by the provision of a fly-wheel on the rotating portion of said machines for resisting sudden speed changes.

9. Apparatus for establishing a voltage tie between two alternating current systems of different frequencies comprising a pair of form wound secondary induction machines having their secondary members mounted on a common shaft and having a pole number relation such that when their primaries are respectively connected to the two systems of different frequencies their secondary frequencies are equal at only one speed, at which speed the voltage transformer ratio between the primaries and secondaries of said machines is such that their normal secondary voltages are substantially equal and an electrical connection between the secondary windings of said machines.

10. In an electric distribution system, a plurality of alternating current systems of different frequencies, induction dynamo electric machines of the wound secondary type having their primary windings respectively connected to all but one of said systems, said machines having polar relations such that when running in one fixed speed relation their secondary frequencies are all equal to the frequency of the other one of said systems, means for mechanically connecting the rotating members of said machines in said fixed speed relation and electric power connections between said secondaries and said other one system.

11. Apparatus for establishing a frequency and voltage tie between three alternating current systems of different frequencies comprising a pair of form wound secondary induction machines having their rotor members mounted on a common shaft and having a pole number relation such that when their primary windings are respectively connected to two of said systems their secondary frequencies are equal at only one speed, at which speed said secondary frequencies are equal to the frequency of the third system and the voltage transformer ratio between the primaries and secondaries of said machines is such that their normal secondary voltages are substantially equal, an electric power connection between said secondary windings, means for establishing an electric power connection between said secondary windings and said third system and a fly-wheel on the common shaft for resisting sudden speed changes.

In witness whereof, I have hereunto set my hand this 4th day of February, 1924.

RUSSELL A. WARNER.